June 12, 1928.
S. G. WINGQUIST
1,673,542
HYDRAULIC COUPLING AND CHANGE SPEED GEAR
Filed Feb. 27, 1923   2 Sheets-Sheet 1
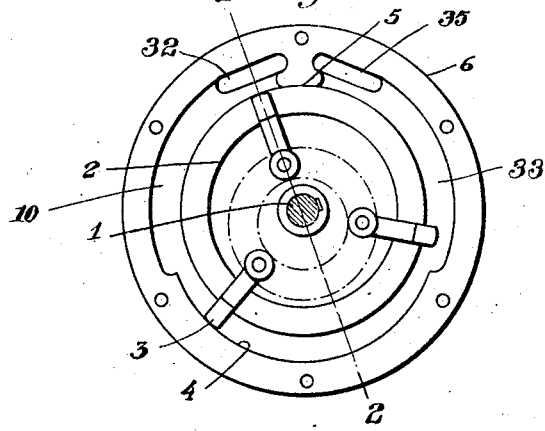
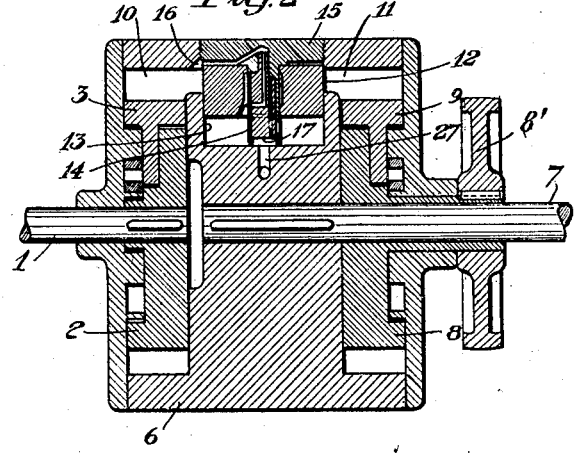
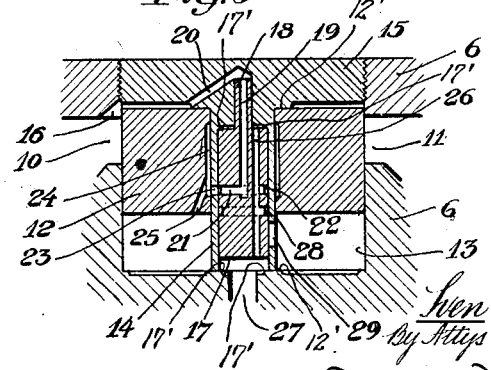
Inventor:
Sven Gustaf Wingquist
By Attys

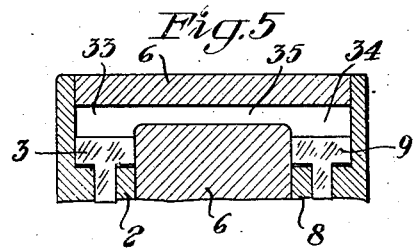
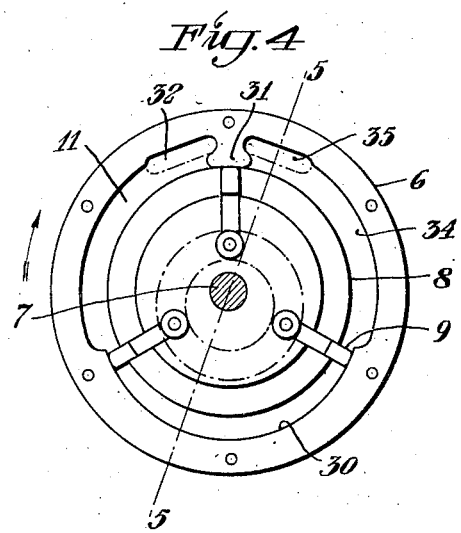
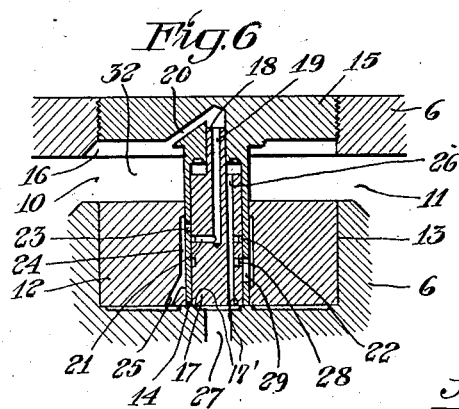

Patented June 12, 1928.

1,673,542

UNITED STATES PATENT OFFICE.

SVEN GUSTAF WINGQUIST, OF GOTTENBORG, SWEDEN.

HYDRAULIC COUPLING AND CHANGE-SPEED GEAR.

Application filed February 27, 1923, Serial No. 621,577, and in Sweden March 23, 1922.

This invention relates to hydraulic couplings and change speed gears, which consist of one or more cooperating pump elements or systems of pump elements, and are provided with controlling means, which are operated, directly or indirectly, through the medium of the fluid pressure existing in the pressure chamber of the device, and by centrifugal force, so that the fluid connections for the various transmission ratios are dependent on and altered with the load upon the gear and the number of revolutions per minute of one of its rotating parts.

In order to facilitate in such couplings and change speed gears the requisite balancing of the pressure and the centrifugal force it has, hitherto, been necessary to give the part of the controlling means acted on by the said forces a large mass, which is, from a constructional point of view, inconvenient, and may, in certain cases, meet with practical difficulties. Besides, difficulties have arisen in effecting a reliable action of the controlling means.

A transmission device, the main valve of which is automatically controlled directly by the concurrent and opposing actions of fluid pressure and centrifugal force, forms the subject-matter of my co-pending United States application Serial No. 575,673, filed July 17, 1922.

The general arrangement of rotors, stator and stator release hereinafter referred to is covered by my United States Patent No. 1,603,179, granted October 12, 1926.

The present invention has for its object to avoid the said drawbacks. The invention consists, according to the preferred embodiment primarily in this, that the main fluid controlling means are operated by an auxiliary valve device acted on by the fluid pressure and centrifugal force and which valve device relieves automatically, above a certain number of revolutions per minute for any given turning moment of the transmission, the said main fluid controlling means from the control of fluid pressure tending to open said means, and exposes, automatically, in exceeding a predetermined turning moment for any given number of revolutions per minute, the controlling means to the control of such fluid pressure. Preferably, the controlling means under one condition will be wholly relieved from unbalanced or one-sided fluid pressure whereby the centrifugal force acting on such means will only have to overcome frictional resistances, and as a consequence the mass of the controlling means may be made small. Under the opposite condition the controlling means is exposed to a one-sided pressure, capable of overcoming both the centrifugal force and the frictional resistances whereby an adjustment of the controlling means to the open position is effected.

In the annexed drawing an embodiment of a two stage hydraulic coupling and change speed gear according to this invention and working according to the differential pumping principle is shown. Fig. 1 is a side view of the gear as viewed from the left of Fig. 2 having the side cover removed. Fig. 2 is an axial section along the line 2—2 of Fig. 1. Fig. 3 is a section on an enlarged scale of the controlling means. Fig. 4 is a view similar to Fig. 1, as viewed from the right of Fig. 2. Fig. 5 is a partial axial section taken on the line 5—5 of Fig. 4. Fig. 6 is a view similar to Fig. 3, showing the valves in their opposite working positions.

In the form of embodiment shown in the drawing, 1 designates a driving shaft rigidly connected to a driving rotor 2 having radially movable vanes 3 co-operating with a working surface 4 and an abutment 5 in a driven rotor 6 constructed as an outer casing and to which the driven shaft 7 is rigidly connected. Obviously as is true of all positively acting transmission devices, the position of the power source and the load may be interchanged so that it is to be borne in mind that the designation of parts as driving or driven is an arbitrary choice taken merely by way of example. Mounted in the rotor 6 is, further, a stator 8 normally held stationary by the brake 8' during the starting of the gear transmission but which is released after direct coupling has been established, said stator having radially movable vanes 9 co-operating, as do the vanes 3, with a working surface 30 and an abutment 31 (Fig. 4) formed in the driven rotor 6. The two rotors 2 and 6 form hereby a vane pump device acting as a delivery pump and the stator 8 together with the driven rotor 6 a vane pump device acting as a receiving pump. Placed between the pressure chambers 10 and 11 of the two pump devices is a piston valve 12 operated by fluid pressure and centrifugal force and which, as the fluid pressure in the chamber 10 overcomes the centrifugal force or vice versa, establishes or cuts off the communication 32 between the two pump devices. In the present form of embodiment the piston valve 12 is guided, exteriorly, in a recess or chamber 13 formed in the rotor 6 and, interiorly, by a gudgeon 14 forming an extension of a cover 15 screwed into the rotor or casing 6. The outer side of the piston valve 12 is through a channel 16 acted on permanently by the pressure fluid in the chamber 10. In the form of embodiment shown the gudgeon 14 is made hollow and forms a seat for a radially movable auxiliary or pilot valve comprising a valve body 17 having at its outer end a relatively thin spindle 18 guided in a bore in the cover 15. The said auxiliary or pilot valve 17, 18 is provided with a central channel 19, which communicates permanently with the pressure chamber 10 through a channel 20 formed in the cover 15 and the channel 16. Further, the channel 19 communicates through a transverse channel 21, an annular channel 22 and an orifice 23 in the hollow gudgeon 14 with an annular chamber 24 between the gudgeon 14 and the controlling valve 12, said chamber communicating in its turn through a channel 25 in the valve body 12 with the chamber 13 at the inner side of said valve 12. Thus, in the position of the auxiliary valve 17, 18 shown in Figs. 2 and 3, a direct communication is established between the pressure chamber 10 and the chamber 13, and the main fluid controlling valve 12 is thereby put in a state of neutral equilibrium with respect to fluid pressure acting upon it. Further, in the valve body 17 there is provided a through-going channel 26, which communicates permanently through a channel 27 in the rotor 6 with the suction chamber 33, 34, 35 of the gear and which establishes in the inner end position of the valve 17 through an annular channel 28 and an orifice 29 in the gudgeon 14 a communication between the chamber 13 and the said suction chamber, as shown in Fig. 6. At both the inner and outer ends of the valve chamber 13 and the interior of the hollow gudgeon 14, annular steps 12' and 17' are provided respectively to prevent the valve members 12 and 17 from contacting with the ends of the valve bores in such manner as to seal the pressure-sensitive surfaces of the valves against the access of fluid pressure.

According to Figs. 2 and 3 the valves 12 and 17, 18 are assumed to have been moved through the action of centrifugal force to their outer positions in which communication is shut off between the pressure chambers 10 and 11 of the two pump devices and a communication established between the pressure chamber 10 and the chamber 13 through the channels 16, 20, 19, 21, 22, 23, 24 and 25. Thus, in the said position, which position represents direct drive, the controlling valve 12 is balanced with respect to fluid pressure and is effectively acted on by the centrifugal force alone. In direct drive the stator is allowed to rotate freely with the external rotor by releasing the brake drum 8'. An automatic stator release applicable to the present invention is disclosed in my United States Patent No. 1,510,368, granted September 30, 1924. If the turning moment of the driven shaft 7 and, therewith, the pressure in the chamber 10 increases, this has no direct control action on the main valve 12, and the existing transmission ratio will be maintained until the pressure becomes sufficiently great to actuate the auxiliary or pilot valve 17, 18. The increasing pressure, acting on the small surface represented by the cross-section of the valve spindle 18, will at any given speed ultimately overcome the centrifugal force acting on said valves. By this means the auxiliary valve 17, 18 is moved to its inner position (Fig. 6), in which the communication between the chamber 13 at the inner side of the controlling valve 12 and the pressure chamber 10 is shut off and instead thereof a communication is established between the said chamber 13 and the suction chamber 33, 34, 35 of the gear through the channels 27, 26, 28 and 29. When this occurs the stator 8 should be checked. The controlling valve 12 is now exposed to pressure on its outer side only and is moved against the action of centrifugal force to its inner end position, in which a communication is established between the two pump devices and, thus, a transmission ratio established which is dependent on the relation between the volumetric capacities of the pump devices. If, now, the turning moment of the shaft 7 and correspondingly the pressure in the chamber 10 be decreased to the limit value, the auxiliary valve 17, 18 will be moved through the action of centrifugal force to its outer end position and establish again a communication between the chambers 10 and 13, so that the controlling valve 12 is hydraulically balanced and will be moved through the action of the centrifugal force to its outer position, shown in Figs. 2 and 3. It will be observed that the valve 12 has in this case to overcome the friction against the guides 13, 14 only, but no pressure, and, furthermore it remains hydraulically balanced as long as the valve 17, 18 retains its outer end position, by which arrangement it is possible to give the valve 12 a mass which though comparatively small, is sufficient to insure positive closing of the main fluid channel between the pressure chambers of the two pumps. It will also be noted that, since the auxiliary valve 17, 18, has to control only the small orifices between the valve chamber 13 and the pressure and the suction chambers, respectively, of the change speed gear, said valve may be constructed with a relatively small effective pressure surface, corresponding to the cross-section of the spindle 18. For the same reason the mass of the auxiliary valve need not be great.

While only a single embodiment of my invention has been hereinbefore described, it will be understood that the invention is not limited thereto but may be otherwise variously modified or embodied without departing from the spirit thereof, as set forth in the following claims.

What I claim as new and desire to secure by Letters Patent of the United States of America is:—

1. A hydraulic coupling and change speed gear including at least one pump device, main valve means adapted to control the flow of fluid pumped by said device, pressure actuated means adapted to control said main valve means, and auxiliary valve means under the opposed control of fluid pressure generated by said pump device, and centrifugal force due to the rotation of a part of the gear, said auxiliary valve means being adapted to hydraulically control the said pressure actuated means.

2. A hydraulic coupling and change speed gear including at least one pump device, main valve means adapted to control the flow of fluid pumped by said device, and auxiliary valve means, said main valve means having one active pressure surface continuously exposed to the fluid pressure generated by the pump, and another active pressure surface alternately exposed to said fluid pressure or vented to substantially atmospheric pressure in accordance with the position of said auxiliary valve means, a sufficiently large mass being associated with said main valve means to insure its closing under the action of centrifugal force due to the normal rotation of the gear when both the said active pressure surfaces are exposed to the fluid pressure generated by the said pump device, but insufficient to close said main valve means when only one of said pressure surfaces is exposed to the fluid pressure.

3. A hydraulic coupling and change speed gear according to claim 1, further characterized in that the said main valve means and auxiliary valve means comprise concentric piston valves one within the other.

4. A hydraulic coupling and change speed gear according to claim 1, further characterized in that said main and auxiliary valve means are piston valves adapted to slide substantially radially with respect to the axis of the gear, whereby they may respond to the direct action of centrifugal force acting upon them.

5. A hydraulic coupling and change speed gear according to claim 1, further characterized in that the said auxiliary valve means comprises a piston valve having a relatively small portion of its cross section exposed to the fluid pressure tending to actuate said valve, whereby the centrifugal action upon the mass of the auxiliary valve will be sufficient under desired operating speeds to overcome the effect of fluid pressure thereon due to the load upon the transmission, and cause said valve to move to or maintain its outer position.

6. A hydraulic coupling and change speed gear including a pump device, main valve means adapted to control the flow of fluid pumped by said device, a hydraulically actuated piston controlling said main valve means, and auxiliary valve means under the simultaneous and opposed control of the fluid pressure generated by said pump device and centrifugal force due to the rotation of a part of said pump device, said auxiliary valve means being adapted in one position to effect a fluid connection between the pressure side of said pump device and said hydraulically actuated piston, and in another position to effect a connection between the suction side of said pump device and said piston.

7. A hydraulic coupling and change speed gear including a pump device, main valve means adapted to control the flow of fluid pumped by said device, centrifugally operated means for closing said main valve, pressure operated means for opening said main valve, and an auxiliary valve under the simultaneous and opposed control of centrifugal force and fluid pressure due respectively to the speed of a part of the gear and the pumping pressure, the said auxiliary valve being adapted in one position to apply counterbalancing fluid pressure to substantially neutralize the hydraulic forces acting on said pressure-operated means whereby the main valve will be closed by centrifugal force, and in another position cut off the said counterbalancing fluid pressure from said pressure-operated means whereby the main valve will be hydraulically opened.

8. A hydraulic coupling and change speed gear comprising a delivery pump system, a receiving pump system, fluid connections between said systems, main valve means adapted to control the flow of fluid between said systems, said main valve means being adapted to be opened by the fluid pressure existing between the pumping systems unless a counter-balancing fluid pressure is applied to said main valve means, and auxiliary means under the simultaneous opposed control of the said fluid pressure between the pumping systems and centrifugal force, the said pressure and force being due respectively to the load upon the gear and the speed of one of its parts, the said auxiliary means being adapted to control the position of said main valve means by subjecting it to or relieving it from a counter-balancing fluid pressure.

9. A hydraulic coupling and change speed gear comprising a delivery pump system, a receiving pump system, fluid connections between said systems, main valve means adapted to control the flow of fluid between said systems, said main valve means being adapted to be closed by centrifugal force due to the rotation of a part of the gear, and said main valve means being further adapted to be hydraulically controlled, and auxiliary means under the simultaneous opposed control of fluid pressure and centrifugal force, the said pressure and force being due respectively to the load upon the gear and the speed of one of its parts, the said auxiliary means being adapted to hydraulically control said main valve means in accordance with the resultant force of the opposing actions of fluid pressure and centrifugal force upon said auxiliary means.

10. A hydraulic coupling and change speed gear including driving and driven elements, transmission pump means interposed between said elements, main valve means adapted to control the fluid pumped by said pump means, fluid-sensitive means adapted to regulate the position of said main valve means, and an auxiliary valve adapted to control the position of said main valve means through the hydraulic control of said fluid sensitive means.

11. A hydraulic coupling and change speed gear including driving and driven elements, a pump interposed between said elements, a main valve to regulate the movement of fluid acted upon by said pump, said main valve being sensitive to fluid pressure, and an auxiliary valve adapted to hydraulically control the position of said pressure-sensitive main valve, whereby there is provided a pilot device for opening and closing the said main valve, said pilot device requiring the application of comparatively slight mechanical effort to perform the desired function.

12. A hydraulic coupling and change speed gear having driving and driven elements, pump means actuated by the difference in speed between said elements, pressure-sensitive main valve means for controlling the flow of fluid through said pump means, and auxiliary valve means adapted to control the said pressure-sensitive main valve means hydraulically.

13. A hydraulic coupling and change speed gear having at least two pumping stages and provided with pressure-sensitive main valve means for controlling the flow of fluid between said pumping stages, and auxiliary valve means sensitive to fluid pressure and adapted to control the said main valve means hydraulically, whereby the transmission ratio of the gear will be automatically regulated in accordance with the load imposed on the gear.

14. A hydraulic coupling and change speed gear having not less than two pumping stages and provided with pressure-sensitive main valve means for controlling the flow of fluid between said pumping stages, and auxiliary means simultaneously controlled by fluid pressure and centrifugal force, adapted to control the said main valve means hydraulically, whereby the transmission ratio of the gear will be automatically regulated in accordance with the torque load and the speed of rotation.

In testimony whereof I affix my signature.

SVEN GUSTAF WINGQUIST.